(No Model.)
F. P. COPPER & A. BAIR.
SIGNAL LANTERN.
No. 417,705. Patented Dec. 24, 1889.
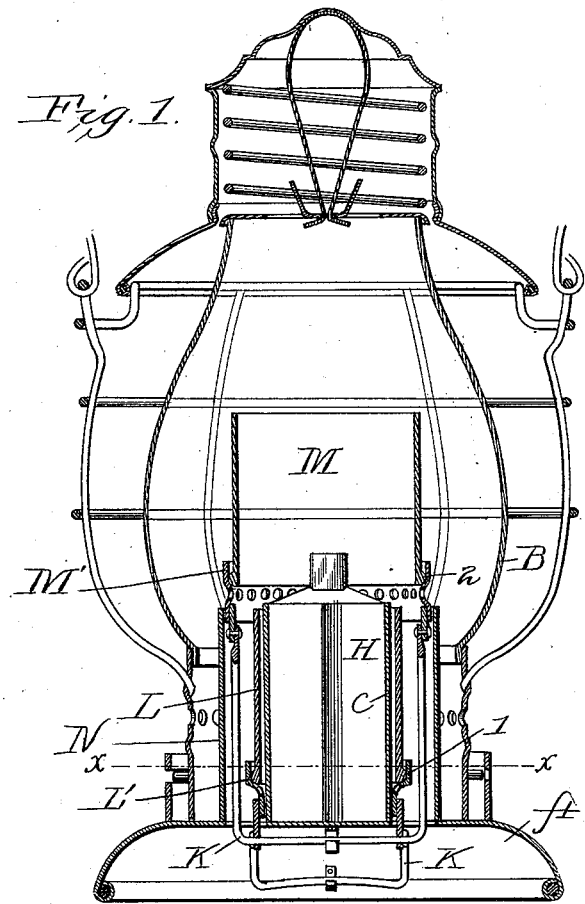
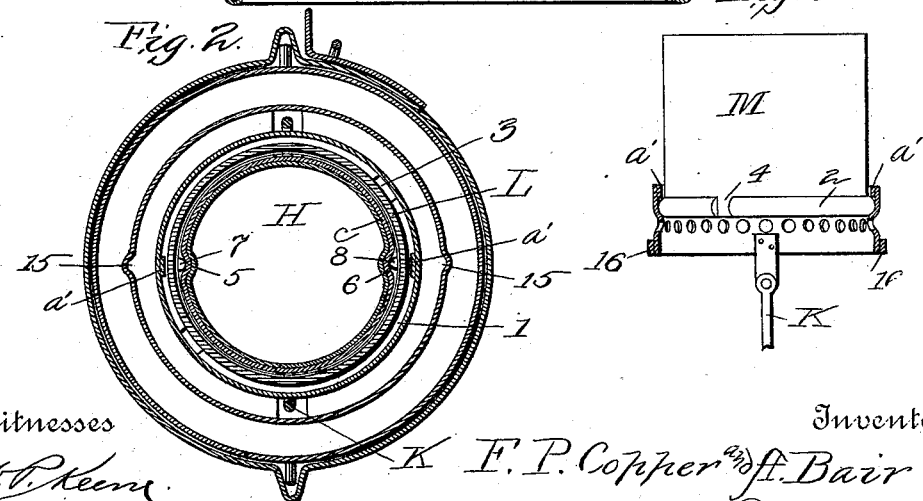
Witnesses
W. C. Keene
James M. Spear
Inventors
F. P. Copper and A. Bair
by Ellis Spear
Attorney

UNITED STATES PATENT OFFICE.

FRANK P. COPPER AND ALVIN BAIR, OF TIFFIN, OHIO.

SIGNAL-LANTERN.

SPECIFICATION forming part of Letters Patent No. 417,705, dated December 24, 1889.

Application filed August 24, 1887. Serial No. 247,710. (No model.)

*To all whom it may concern:*

Be it known that we, FRANK P. COPPER and ALVIN BAIR, of Tiffin, in the county of Seneca and State of Ohio, have invented a new and useful Improvement in Signal-Lanterns; and we do hereby declare that the following is a full, clear, and exact description of the same.

Our invention relates to signal-lanterns, and is an improvement in that class of lanterns in which movable and tubular signal-glasses are arranged concentrically about the light and are adapted to be separately moved up or down into and out of range with the light.

The main features of this class of lanterns are shown in Patent No. 245,575, granted us on July 13, 1886, by the United States.

Our invention consists in the manner of securing the glasses to their movable supports, also in the manner of holding the lamp, and, further, in the special details of construction, all as hereinafter fully described, and pointed out in the claims.

In the drawings, Figure 1 is a central vertical section of the lantern, one of the glasses being in its raised position. Fig. 2 is a section on line *x x* of Fig. 1. Fig. 3 is a detailed view illustrating the formation of the glasses and the support therefor.

A is the base of the lamp, and B the globe. Upon the horizontal portion *a* of the base-plate a cylindrical socket *c* is supported, this being open at the top and adapted to receive and hold the lamp or oil-reservoir H securely in place, at the same time permitting its free removal. For the purpose of better holding the oil-reservoir the interior of the socket is provided with vertical ribs 10, positioned, preferably, diametrically opposite each other. The oil-reservoir is fitted snugly to the socket, and grooves are formed in the side opposite each other, extending vertically and adapted to the ribs of the socket. In placing the lamp the grooves and ribs are brought into alignment, and the lamp is thus directed to position and held from jolting and circumferential movement.

The signal-glasses are shown at L M, and are arranged concentrically about the lamp, as in our aforesaid patent. They are formed with beads 1 2 about their lower ends and cut-away portions 3 4, positioned directly opposite. The means for supporting the glasses consists of the bands or rings L' M', upon the interior of which suitable seats are provided for the glasses by swaging in a portion of the band, thus forming a bead. Lugs *a'* are also formed on the upper inner edge of the bands and opposite each other, adapted in size to the cut-away portions of the glass beads. Suitable ventilating-openings may also be formed in the rings. By this construction the glasses are held entirely by their lower edges and are removably supported by the rings, the removal being effected by turning the glasses until the cut-away portions register with the holding-lugs. The rings themselves are carried by the upper ends of the operating-bails K K, which extend through and are adapted to move in the base. Catches are provided, as in our patented form of lantern, on the base of the lantern, by which the bails and glasses may be held in position. A second socket N is provided about the outer glass, and this, together with the lamp-socket, is provided with vertical grooves designed for the purpose of guiding the glasses in their movement up and down. This manner of supporting the glasses by the rings at their lower edges instead of the arms extending up within the glasses has the advantage of presenting no obstructions to the emission of the rays of light in all directions. The grooves 5 6 in the lamp-socket are formed on the outer side thereof, and into these project studs 7 8, secured to the inside of the band for supporting the inner glass. In the outer socket the grooves 15 are formed on the inner side and the studs 16 are positioned upon the outer side of the ring. The glasses are by these means steadied and guided in their vertical movement.

What we claim is—

1. In combination, the base A, the lamp-reservoir formed separately from the base to be removable therefrom, the lamp, the two glasses arranged to be moved up and down, the holding-rings for said glasses, located at their lower edges, the outer socket, the said outer socket and lamp-socket extending upward a sufficient distance to guide and surround the rings in their vertical movement, and having grooves to receive studs projecting from the rings at the bottoms of the glasses, substantially as described.

2. In combination, the base A, a removable lamp, a socket for said lamp, and the rib-and-groove connection between said socket and lamp, substantially as described.

In testimony whereof we have signed our names to this specification in the presence of two subscribing witnesses.

FRANK P. COPPER.
ALVIN BAIR.

Witnesses:
J. C. RICKENBAUGH,
D. C. BAKER.